US006549704B2

(12) United States Patent
Ukrainczyk

(10) Patent No.: US 6,549,704 B2
(45) Date of Patent: Apr. 15, 2003

(54) FABRICATION OF MICROLENSED FIBER USING DOPED SILICON DIOXIDE

(75) Inventor: Ljerka Ukrainczyk, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 33 days.

(21) Appl. No.: 09/892,087

(22) Filed: Jun. 26, 2001

(65) Prior Publication Data

US 2003/0007727 A1 Jan. 9, 2003

(51) Int. Cl.[7] .............................. G02B 6/32; C03B 37/00
(52) U.S. Cl. ........................... 385/33; 385/385; 385/31; 385/35; 385/38; 385/95; 385/96; 385/141; 65/387
(58) Field of Search ................................ 385/31, 33, 34, 385/35, 38, 95, 96, 97, 98, 99, 123, 141; 65/385, 387

(56) References Cited

U.S. PATENT DOCUMENTS

| | | | | |
|---|---|---|---|---|
| 4,119,362 A | * | 10/1978 | Holzman | 385/73 |
| 4,380,365 A | * | 4/1983 | Gross | 219/121.65 |
| 4,456,330 A | * | 6/1984 | Bludau | 385/33 |
| 5,011,254 A | * | 4/1991 | Edwards et al. | 385/33 |
| 5,080,706 A | * | 1/1992 | Snyder et al. | 65/102 |
| 5,293,438 A | | 3/1994 | Konno et al. | 385/35 |
| 5,457,759 A | * | 10/1995 | Kalonji et al. | 385/124 |

* cited by examiner

*Primary Examiner*—Brian Healy
(74) *Attorney, Agent, or Firm*—Timothy M. Schaeberle; Scott Reese

(57) ABSTRACT

A method of making a microlensed fiber by splicing a doped silica rod to an optical fiber and shaping the end of the doped silica rod into a plano-convex refracting lens. The doped silica rod has a lower melting point and annealing point than undoped silica, and therefor less power is required to manufacture the microlensed fiber. This decreases wear to the heating elements of the manufacturing equipment and therefor increases the number of microlensed fibers that can be manufactured between cycles. A further aspect of the present invention is a microlensed fiber made by the above process.

32 Claims, 6 Drawing Sheets

FABRICATION OF MICROLENSED FIBER USING DOPED SILICON DIOXIDE

BACKGROUND OF THE INVENTION

This invention relates to a microlensed optical fiber and a method of making the same. The microlensed optical fiber of the present invention is useful in a variety of optical systems including optical switches, connectors and terminals.

The development, miniaturization, and simplification of optical devices for applications such as computing and communications depends on the development of new optical components. Particularly desirable are optical coupling components that are easy and economical to fabricate, durable, and that have a high coupling efficiency.

Conventional coupling systems using a discrete spherical lenses, ball lenses, grin lenses (gradient refractive index) joined to the optical fibers via adhesives suffer because aligning the lens with the fiber is difficult. Fabrication is therefore expensive and often results in high variability among components. These components may also suffer from mechanical and thermal instability.

A microlensed fiber, having the lens and the fiber fused together as a single unit is a desirable alternative to adhesive-joined coupling systems. One method of fabricating such a component is to melt the tip portion of an optical fiber, to form a spherical lens connected to the fiber tip. This requires to a very uniform heat source to allow for the formation of highly uniform spherical lens surface (see for example U.S. Pat. No. 5,293,438 and references therein). Because the temperature that is required to form a spherical lens is higher than that required to simply splice two fibers together, more power must be supplied to the heat source. This results in increased wear, increased maintenance, and shorter lifetimes for the heating equipment. Accordingly, it is desirable to develop a method of fabricating a microlensed fiber that requires less heating power and is therefor capable of producing many units between maintenance cycles.

SUMMARY OF THE INVENTION

One aspect of the present invention is to provide a microlensed fiber comprising a plano-convex refractive lens spliced to an optical fiber. According to one embodiment, the lens comprises silica doped with one or more compounds selected from $X_2O$, $YO$, $Z_2O_3$, $TO_2$, or $R_2O_5$; wherein X is Na, K, Li, Al, or Cs;

Y is Mg, Co, or Zn;

Z is B, Al, Ga, Sb or Bi;

T is Ge or Ti; and

R is P.

A further aspect of the present invention is to provide a process for manufacturing a microlensed fiber comprising;
 a) splicing a doped silica rod to an optical fiber by contacting an end of the optical fiber with an end of the doped silica rod and heating the area of contact to a temperature effective for joining the fiber and the rod,
 b) heating a region of the doped silica rod while simultaneously applying tension to the rod such that the doped silica rod is cut in the heated region to a desired predetermined length, and
 c) heating a region of the doped silica rod that remains spliced to the optical fiber so that the end of the doped silica rod melts into a plano-convex lens surface with a desired radius of curvature.

DESCRIPTION OF PREFERRED EMBODIMENTS

Figure 1:
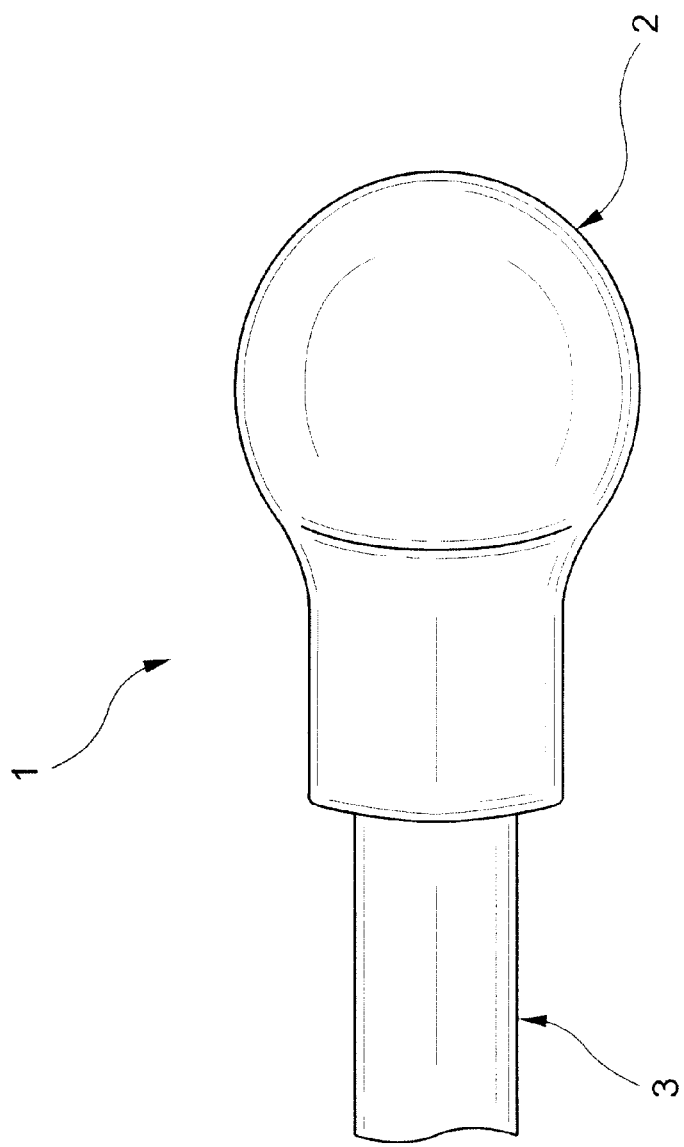
FIG. 1 A microlensed fiber 1 comprising a plano-convex lens 2 spliced to an optical fiber 3.

Manufacturing a microlensed fiber requires a very uniform heat source to allow for the formation of a highly uniform spherical lens. One example of a suitable heat source is a fusion splicer with a tungsten filament. In particular a fusion splicer with a filament loop such as a Vytran fusion splicer provides very uniform heat allowing for formation of spherical lenses with a symmetrical circular mode field.

The fabrication of the microlensed fiber may comprise the following steps:
 a) Splicing the optical fiber to the silica rod. In this step the optical fiber and a glass rod from which the lens will be formed are aligned end—to—end and the fiber and the rod are pushed together while heated by the filament as in a typical splicing of the two optical fibers. The filament power is similar to the power used to splice two identical optical fibers.
 Taper cut of the silica rod. After the splice, the filament hot zone is moved by the desired distance along the silica rod. Filament power is then increased, and the silica rod is taper cut by pulling the rod while it is being heated.
 c) Melt back and lens formation. Following the taper cut, the filament hot zone is moved towards the splice by a distance that depends on the desired radius of curvature and the filament power is further increased. This step forms the spherical lens.

Because the filament powers used in steps b and c are much higher than the powers used during standard splicing of two fibers, the filament lifetime is greatly shortened in lens making process compared to when the filament is used for splicing only. For instance, a typical filament loop can make about 500 SMF-28 to SMF-28 splices, but can make only about 80 silica lenses. This is a major limitation for having a manufacturing process that uses pure silica as lens material.

In view of this, the present invention features a method of making a microlensed fiber, wherein the method provides increased filament lifetime during lens formation by using a glass that has a lower annealing point and/or a lower viscosity than silica. One embodiment of the present invention is a process for manufacturing a microlensed fiber comprising:

splicing a doped silica rod to an optical fiber by contacting an end of the optical fiber with an end of the doped silica rod and heating the area of contact to a temperature effective for joining the fiber and the rod, heating a region of the doped silica rod while simultaneously applying tension to the rod such tht the doped silica rod is cut in the heated region to a desired predetermined length, and heating a region of the doped silica rod that remains spliced to the optical fiber so that the end of the doped silica rod melts into a plano-convex surface with a desired radius of curvature.

According to one embodiment of the present invention, heating is supplied by a resistively heated filament. A particularly preferred heat source is a fusion splicer with a resistively heated filament loop. According one embodiment the filament loop comprises tungsten.

According to one embodiment of the present invention the doped silica rod is heated at a temperature between about 1500° C. and about 3000° C. as the doped silica rod is cut to a desired predetermined length. According to one embodiment the doped silica rod is heated at temperature between about 1500° C. and 3000° C. during lens formation.

Many optical fibers are known in the art, and the choice of an appropriate optical fiber for a particular application is within the ability of one skilled in the art. Particularly preferable fibers according to the present invention are single mode fibers (SMF) comprising silica. An example of such a fiber is SMF-28 (Corning Inc.).

Doped silica materials suitable for making the lens portion of the microlensed fiber preferalby have a softening point and a viscosity that is lower than those of silica. Particularly preferred materials have a coefficient of thermal expansion (CTE) between about $5 \times 10^{-7}$ to about $35 \times 10^{-7}$/°C.

Surface tension is another property that affects the lens formation during melt back. In general, the presence of a dopant decreases surface tension of the glass, which also allows the use of less power (i.e. lower temperature) during melt back.

Examples of doped silica materials suitable for making the lens include silica doped with one or more compounds selected from $X_2O$, $YO$, $Z_2O_3$, $TO_2$, or $R_2O_5$; wherein X is Na, K, Li, Al, or Cs; Y is Mg, Co, or Zn; Z is B, Al, Ga, Sb or Bi; T is Ge or Ti; and R is P. Examples of particularly preferred materials are silica doped with $B_2O_3$, $GeO_2$, $B_2O_3$-$GeO_2$, $B_2O_3$-$P_2O_5$, $P_2O_5$, $GeO_2$-$P_2O_5$, $GeO_2$-$B_2O_3$-$P_2O_5$, $Al_2O_3$, or $GeO_2$-$B_2O_3$. Even more preferred materials comprise silica doped with about 1 to about 20 wt % boron oxide, and silica doped with about 1 to about 30 wt % germanium oxide.

According to some embodiments of the present ivention, the doped silica materials used for the lens portion of the microlensed fiber have a CTE that is greater than the CTE of the optical fiber and viscosity that is lower than that of optical fiber. If this is the case, then when the optical fiber and the doped silica rod are spliced together, the tensile stress is slightly on the optical fiber side (low expansion side) of the splice. This stress is slightly reduced if the diameter of the doped silica rod is larger than that of the optical fiber.

Accordingly, one embodiment of the instant invention utilizes a doped silica rod with a diameter slightly larger than that of the optical fiber. A particularly preferred embodiment uses a 200 μm or 250 μm diameter doped silica fiber spliced to a 125 μm optical fiber.

Another aspect of the present invention is a microlensed fiber comprising a plano-convex refractive lens spliced to an optical fiber, wherein the plano-convex lens comprises doped silica as described above. According to one embodiment, the core of the optical fiber is broadened at the splice.

Particularly preferred microlensed fibers are fabricated as described above. According to one preferred embodiment, the doped silica rod from which the lens is formed is larger in diameter than the optical fiber.

Microlensed fibers according to the present invention preferably exhibit beam profiles that are Gaussian in the x and y directions. According to one embodiment of the present invention, the mode field at the splice is greater than the nominal mode field of the optical fiber.

EXAMPLE 1

Microlensed fibers were fabricated as described above, using a SMF-28 fiber optic fiber and 200 μm diameter rods comprising silica, silica doped with about 4 wt. % boron oxide, and silica doped with about 10 wt. % germanium oxide. The properties of the lens materials are given in Table 1 below.

TABLE 1

Properties of glasses used for lenses.

| Property | Silica | Silica Doped With Boron Oxide | Silica Doped With Germanium Oxide |
|---|---|---|---|
| Index of refraction ($n_D$) | 1.457 | 1.457 | 1.467 |
| CTE ($\times 10^{-7}$/° C.) | 4.5 | 9 | 11 |
| Annealing T (° C.) | 1107 | 999 | 1062 |
| Strain Point (° C.) | 1031 | 910 | 955 |
| Elasticity (×106 psi) | 10.0 | 9.2 | 9.6 |
| α ($\times 10^{-7}$ deg-1) at Strain Point | 0.9 | 4.6 | 8.3 |
| Softening Point (° C.) | 1630 | 1520 | 1567 |
| viscosity (ln $\eta_o$, (Poise)) | −13.738 | −8.793 | −10.912 |
| Activation Energy (Q(K)) | 60600 | 49520 | 55330 |

Figure 2:
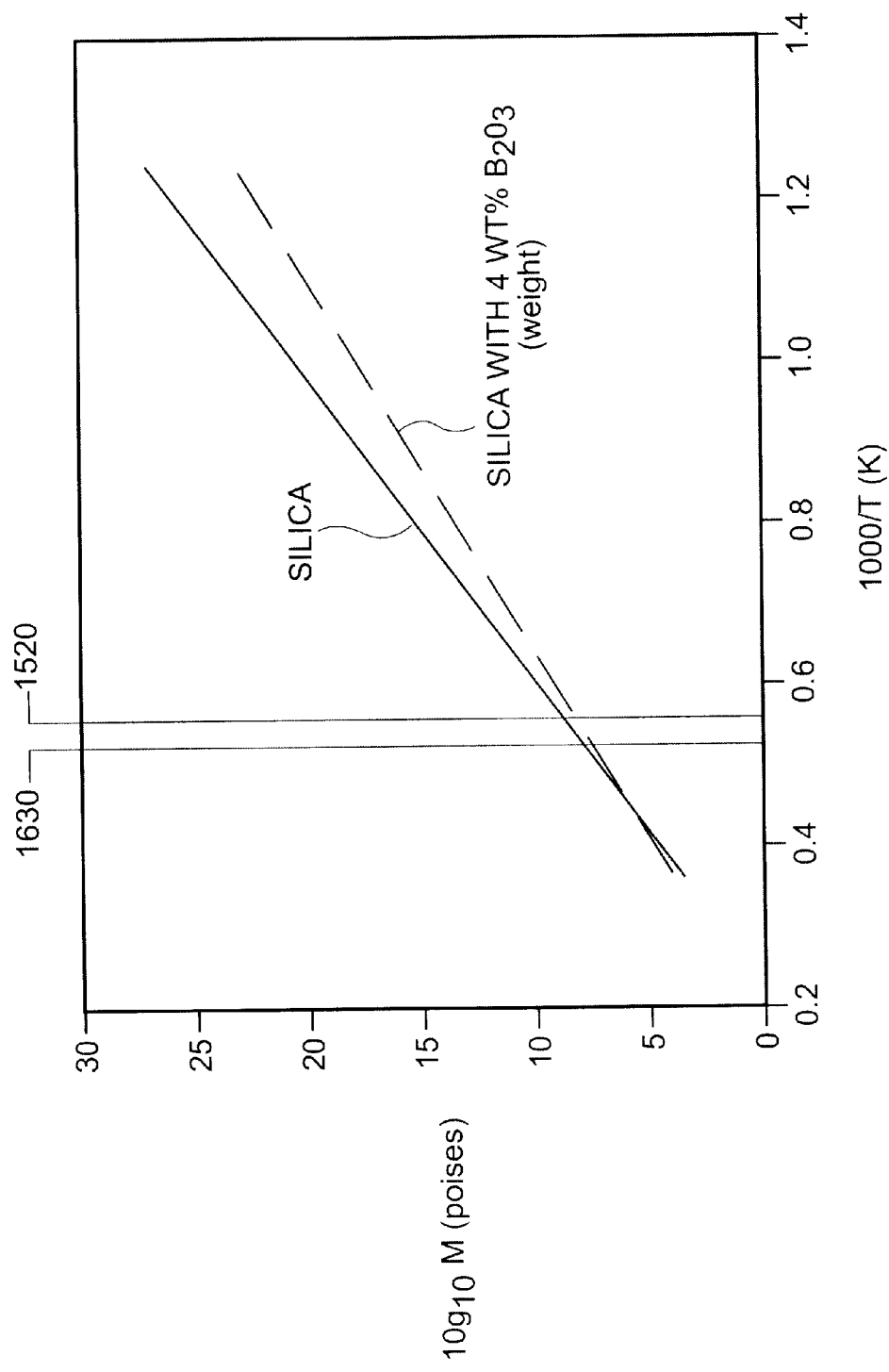
FIG. 2 Viscosity of silica and borosilicate glass as a function of temperature.

FIG. 2 shows the plot of viscosity as a function of temperature for the silica and borosilicate glass, calculated using $\ln \eta = \ln \eta_o + Q/T$ where $\eta$ is viscosity at a given temperature, $\eta_o$ is viscosity at infinite temperature, Q is activation energy divided by gas constant and T is absolute temperature. It can be seen that doping with boron oxide decreases the viscosity of the glass, allowing lower temperature during lens formation.

The approximate filament power required for each of the steps using each of the lens materials is shown in Table 2. All filament powers are for a standard filament loop on a Vytran FFS-2000 splicer (15 A DC power supply).

TABLE 2

Power (W) used in each step of manufacturing a microlensed fiber using different lens materials.

| Manufacture Step | Silica | Silica Doped with Boron Oxide | Silica Doped with Germanium Oxide |
|---|---|---|---|
| Splicing | 20–23 | 15–20 | 17–22 |
| Taper Cut | 24–27 | 16–24 | 22–25 |
| Lens Formation | 28–32 | 23–28 | 24–30 |

A indicated in Table 2, the power required in each of the three heating steps is less for the doped silica lenses than for the undoped lens. The number of lenses that can be made per filament using the doped silica glasses is about double the number that can be made when silica is used.

Figure 3A:
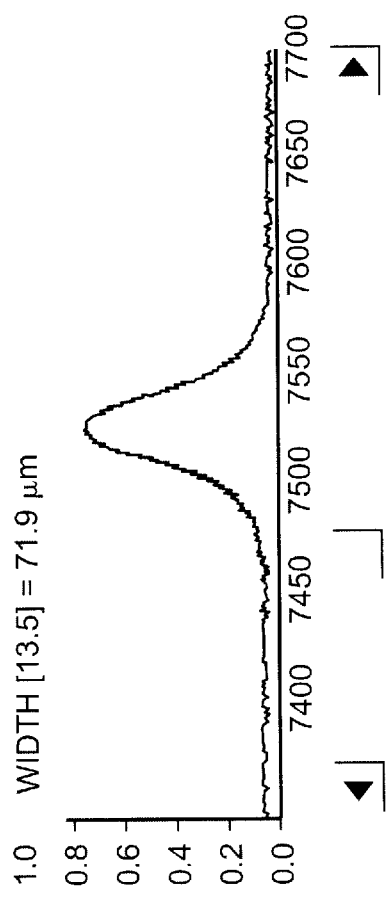
FIG. 3 Beam profiler data for a borosilicate lens in the x and y direction showing spherical mode field with Gaussian shape.
Figure 3B:
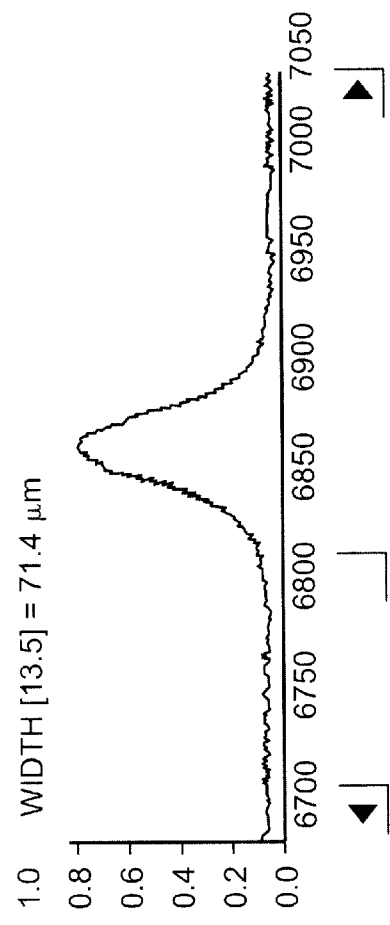

FIGS. 3A and 3B show the beam profiler data for the boronsilicate lenses. The beam profile is Gaussin in both the x and y directions and shows no ellipticity. The lens is symmetric and does not "droop" during the lens forming process. The mode field diameter (MFD) was measured near the lens surface.

Figure 4A:
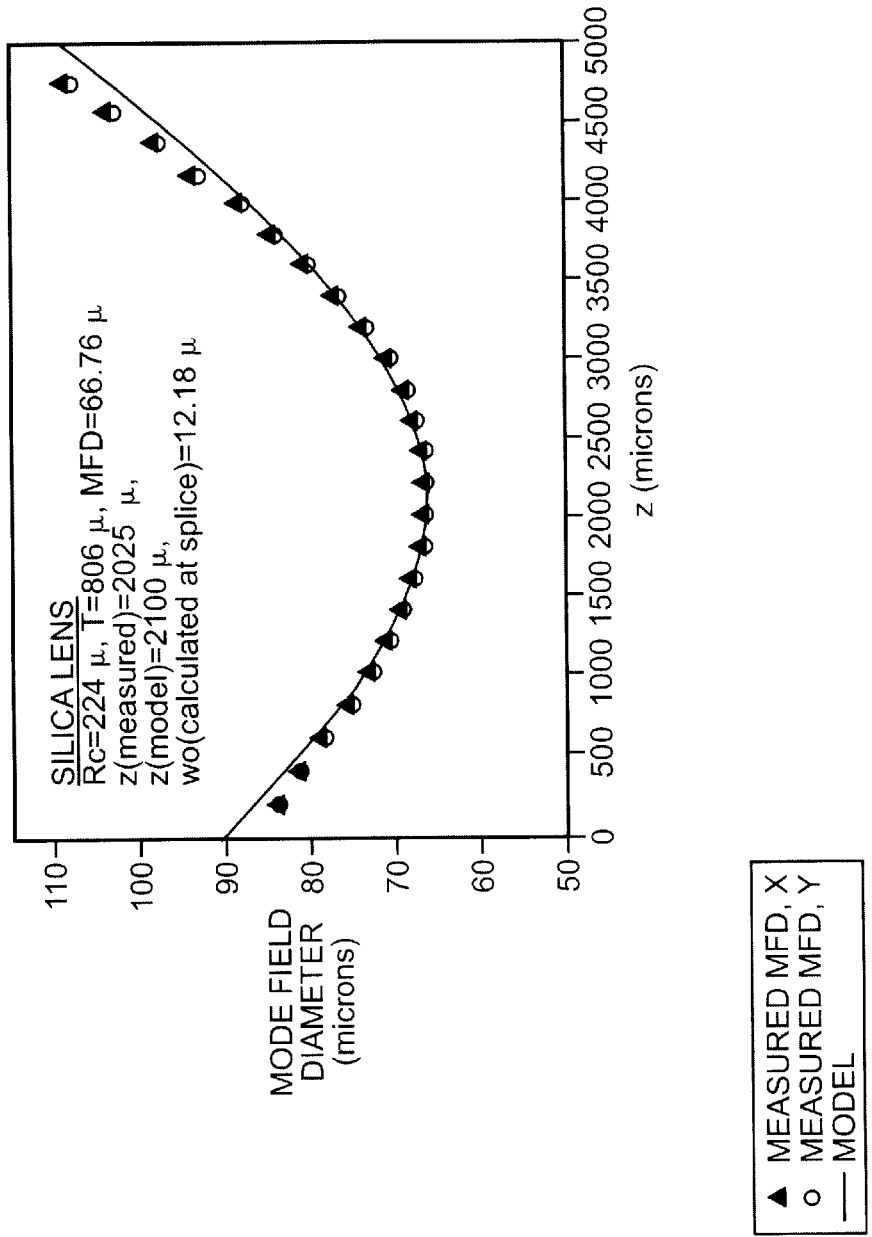
FIG. 4 Mode field diameter at 1550 nm as a function of distance from the lens surface for a lens made from silica 4A and borosilicate glass 4B.
Figure 4B:
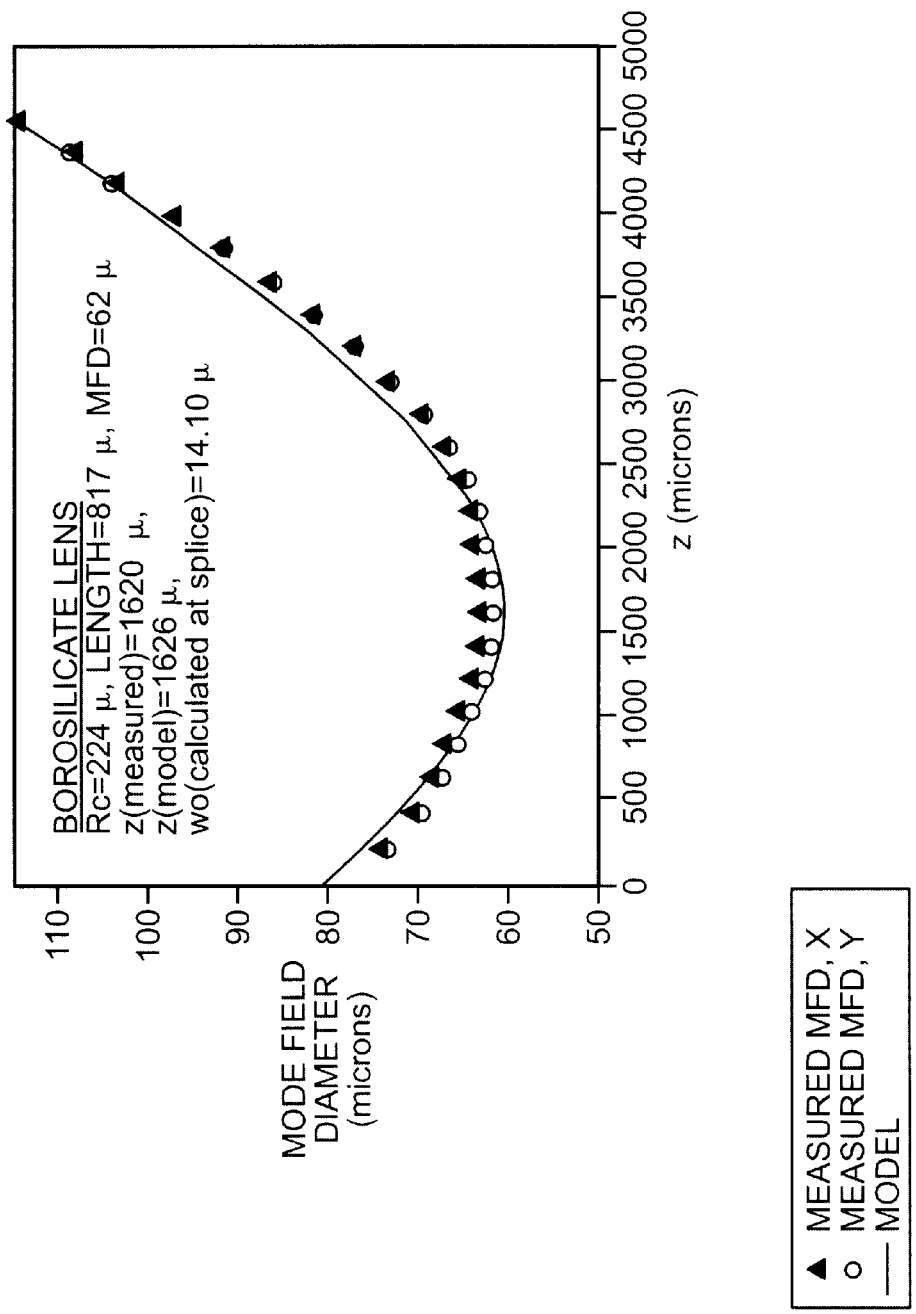
Figure 5:
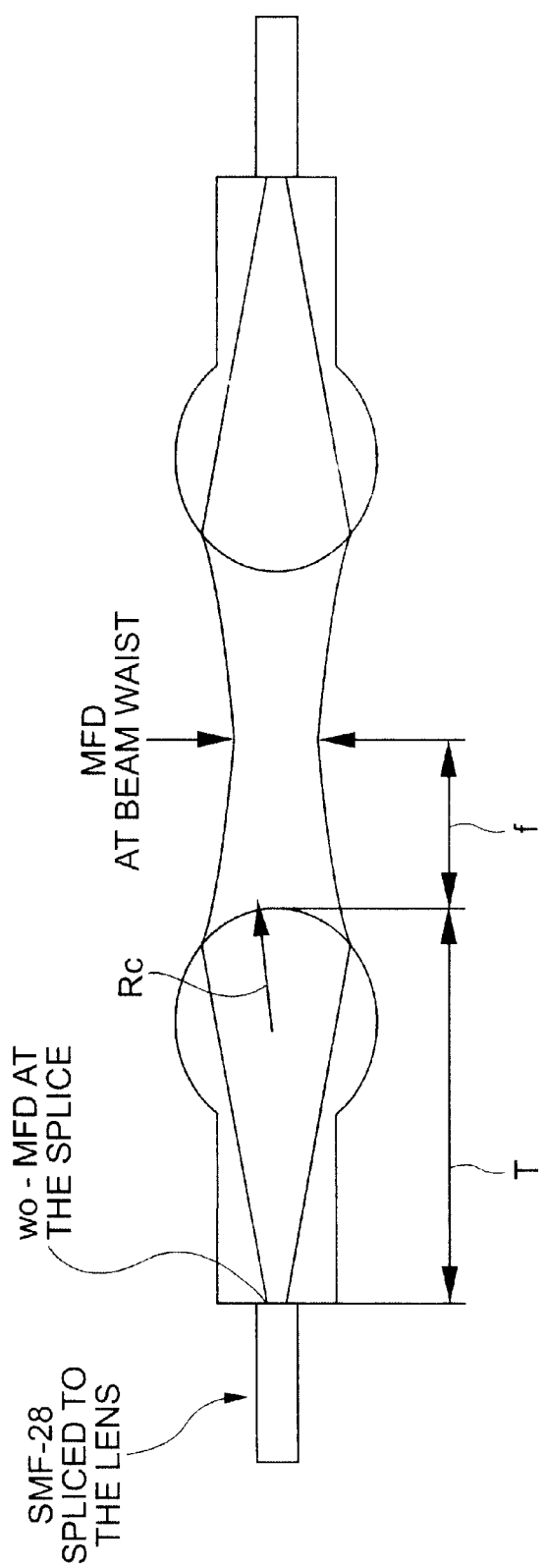
FIG. 5 Geometry parameters relevant to optical coupling of two microlensed fibers.

Beam profiler data as a function of distance for a silica and borosilicate lens are shown in FIG. 4A and FIG. 4B, respectively. Beam profiles were collected for x and y direction in increments of 0.25 µm. The fitted line on FIG. 4 represents a fit of Gaussian beam model to the data simulated using the measured lens geometry. The model shows that the mode field at the splice is larger than the nominal mode field of SMF-28. This indicates that there is a thermal core broadening at the splice (the mode field diameter of SMF-28 used here is 10.8 µm at 1550 nm).

The thermal core broadening is larger in the case of borosilicate lens than in the case of pure silica. Without being bound by theory, it is likely that boron facilitates germanium diffusion at the splice. Furthermore, the fit of the model is much better for silica lenses than for borosilicate lenses which all show a flat region of mode field diameter between about 1.5 and about 2.5 cm away from lens surface. Collimation is better with the $B_2O_3$-$SiO_2$ lens than with the $SiO_2$ lens.

The coupling efficiency of a microlensed fibers with a 50–70 µm mode field using $B_2O_3$-$SiO_2$ lenses is between 0.08 and about 0.2 dB. When the lens surfaces are coated with an anti-reflective coating return loss is greater than 60 dB and polarization loss is less than 0.01 dB.

REFERENCES

The following references, to the extent that they provide exemplary procedural or other details supplementary to those set forth herein, are specifically incorporated herein by reference.

Mamiki et al, "Microlensed Optical Terminals and Optical System Equipped Therewith, and Methods for Their Manufacture, Especially an Optical Coupling Method and Optical Coupler for Use Therewith" U.S. Pat. No. 5,293,438, 1994.

What is claimed is:

1. A process for manufacturing a microlensed fiber comprising the steps of
   a) splicing a doped silica rod to an optical fiber by contacting an end of the optical fiber with an end of the doped silica rod and heating the area of contact to a temperature effective for joining the rod and the fiber,
   b) heating a region of the doped silica rod while simultaneously applying tension to the rod such that silica rod is cut in the heated region, and
   c) heating a region of the doped silica rod that remains spliced to the optical fiber so that the doped silica rod melts into a plano-convex lens.

2. A process according to claim 1, wherein the doped silica rod comprises silica doped with one or more compounds selected from $X_2O$, YO, $Z_2O_3$, $TO_2$, or $R_2O_5$; wherein X is Na, K, Li, Al, or Cs; Y is Mg, Co, or Zn; Z is B, Al, Ga, Sb or Bi; T is Ge or Ti; and R is P.

3. A process according to claim 2, wherein the doped silica rod comprises silica doped with $B_2O_3$, $GeO_2$, $B_2O_3$-$GeO_2O_3$, $B_2O_3$-$P_2O_5$, $P_2O_5$, $GeO_2$-$P_2O_5$, $GeO_2$-$B_2O_3$-$P_2O_5$, $Al_2O_3$, or $GeO_2$-$B_2O_3$.

4. A process according to claim 3, wherein the doped silica rod comprises silica doped with $B_2O_3$.

5. A process according to claim 4, wherein the doped silica rod comprises silica doped with 1 to about 20 wt % $B_2O_3$.

6. A process according to claim 3, wherein the doped silica rod comprises silica doped with $GeO_2$.

7. A process according to claim 6, wherein the doped silica rod comprises silica doped with about 1 to about 30 % $GeO_2$.

8. A process according to claim 1, wherein the softening point of the doped silica rod is lower than the softening point of silica.

9. A process according to claim 1, wherein the coefficient of the thermal expansion of the doped silica rod is between about $1 \times 10^{-7}$ and about $35 \times 10^{-7}/°C$.

10. A process according to claim 1, wherein the optical doped fiber is a single mode optical fiber.

11. A process according to claim 10, wherein the optical fiber is a SMF-28 optical fiber.

12. A process according to claim 1, wherein the diameter of the doped silica rod is greater than the diameter of the optical fiber.

13. A process according to claim 12, wherein the diameter of the doped silica rod is about 200 µm and the diameter of the optical fiber is about 125 µm.

14. A process according to claim 1, wherein the core of the optical fiber is broadened at the splice.

15. A process according to claim 1, wherein the mode field at the splice is greater than the nominal mode field of the fiber.

16. A process according to claim 1, wherein the temperature during step b) is between about 1500° and about 3000° C.

17. A process according to claim 1, wherein heating is performed using a resistively heated tungsten filament.

18. A microlensed fiber comprising a doped silica rod spliced to an optical fiber, wherein the terminal end of the doped silica rod is shaped into a plano-convex refracting lens.

19. A microlensed fiber according to claim 18, wherein the doped silica rod comprises silica doped with one or more compounds selected from $X_2O$, YO, $Z_2O_3$, $TO_2$, or $R_2O_5$; wherein X is Na, K, Li, Al, or Cs; Y is Mg, Co, or Zn; Z is B, Al, Ga, Sb or Bi; T is Ge or Ti; and R is P.

20. A microlensed fiber according to claim 19, wherein the doped silica rod comprises silica doped with $B_2O_3$, $GeO_2$, $B_2O_3$-$GeO_2$, $B_2O_3$-$P_2O_5$, $GeO_2$-$P_2O_5$, $GeO_2$-$B_2O_3$-$P_2O_5$, $Al_2O_3$, or $GeO_2$-$B_2O_3$.

21. A microlensed fiber according to claim 20, wherein the doped silica rod comprises silica doped with $B_2O_3$.

22. A microlensed fiber according to claim 21, wherein the doped silica rod comprises silica doped with 1 to about 20 wt % $B_2O_3$.

23. A microlensed fiber according to claim 20, wherein the doped silica rod comprises silica doped with $GeO_2$.

24. A microlensed fiber according to claim 23, wherein the doped silica rod comprises silica doped with about 1 to about 30 wt % $GeO_2$.

25. A microlensed fiber according to claim 18, wherein the softening point of the doped silica rod is lower than the softening point of silica.

26. A microlensed fiber according to claim 18, wherein the coefficient of thermal expansion of the doped silica rod is between about $1 \times 10^{-7}$ and about $35 \times 10^{-7}/°C$.

27. A microlensed fiber according to claim 18, wherein the optical fiber is a single mode optical fiber.

28. A microlensed fiber according to claim 27, wherein the optical fiber is a SMF-28 optical fiber.

29. A microlensed fiber according to claim 18, wherein the diameter of the doped silica rod is greater than the diameter of the optical fiber.

30. A microlensed fiber according to claim 29, wherein the diameter of the doped silica rod is about 200 µm and the diameter of the optical fiber is about 125 µm.

31. A microlensed fiber according to claim 18, wherein the core of the optical fiber is broadened at the splice.

32. A microlensed fiber according to claim 18, wherein the mode field at the splice is greater than the nominal mode field of the fiber.

* * * * *